Patented Mar. 26, 1935

1,995,371

UNITED STATES PATENT OFFICE 1,995,371

LUBRICANT

John F. Werder, Lakewood, Ohio, assignor of one-half to Edmund Rogers, South Euclid, Ohio No Drawing. Application February 11, 1931,
Serial No. 515,145

2 Claims. (Cl. 87—9)

This invention relates to the art of lubricating compounds and is adapted for use in connection with the lubrication of automobiles as well as all other forms of machinery.

It is to be understood that the particular compound herein disclosed may be used in any connection of which it is capable, and furthermore, that the composition thereof may be varied as to the choice of elements in the compound and the specific percentage composition thereof without departing from the spirit of the present invention as herein set forth and claimed.

Heretofore in the lubrication of automobiles and other machinery, especially certain parts thereof, one practice has been to force a grease under considerable pressure by means of grease cups or other special fittings into the spaces which it is desired to occupy for purposes of lubrication.

In the case of grease which is of a comparatively high degree of viscosity, there is more or less difficulty or inconvenience in the handling of the same due to its very nature and consistency.

In the case of oil which, as commonly used for lubrication, has been of a comparatively light grade, this has also been found objectionable for the reason that it does not possess sufficient body to remain at the desired points between the parts which are subjected to friction during their operation.

Thus, the oil which possesses sufficient fluidity to facilitate the application of the same to the various parts which are to be lubricated, lacks the desired thickness or body for satisfactory lubricating purposes, especially at certain places in the machine structure; also, in those cases where oil cups are employed, there is the familar danger of the oil failing to feed from the cups to the parts to be lubricated. The grease form of lubricant, although satisfactory so far as its quality as a friction-relieving medium between the parts is concerned, lacks the element of convenience and efficiency from the standpoint of application to the various parts, as above explained.

The purpose of the present invention therefore resides in devising a compound which may be conveniently and efficiently applied to the various parts of an automobile or other form of machine structure and which, at the same time, will reach all the points which are to be lubricated and will possess the most desired efficiency in actual and continued lubrication of the parts.

In other words, the lubricating compound contemplated by the present invention will possess the advantages of both oil on the one hand and grease on the other, but without the objectionable features of either of these two old forms of lubricants.

The present improved form of product is obtained by compounding together into complete solution a comparatively heavy lubricant, either grease or oil, and a suitable solvent therefor of either gaseous or liquid form. Among the various comparatively heavy lubricants, which might be referred to as constituting a grease base, are the heavy petroleum products, such as petrolatum, wax tailings, petroleum grease, etc. Another grease base which might be used in this connection is solidified oil which is a grease made by solidifying light oils through the use of soaps, (lime, soda or aluminum stearate). Still other grease bases are the "blown" oils which are produced by "blowing" certain oils such as fish oil, rape-seed oil, cotton-seed oil, etc., which are appreciably thickened thereby. And, in addition to using any one of these various products alone as a grease base, any suitable combination of the same may be employed for this purpose.

As a suitable solvent for the grease base, there may be adopted any of the following gaseous products of petroleum,—methane, ethane, propane, or butane. These it might be necessary to maintain under pressure. Derivatives of these gases may also be employed for this purpose.

Among the liquid solvents which are adapted for this purpose, are other petroleum products, such as gasoline, naphtha, etc. Other suitable solvents of liquid form are carbon tetrachloride, benzol, (which of course is a coal tar product), turpentine, etc.

An instance of how these products may be combined together is as follows:
One gallon of mineral oil;
One-half pound of aluminum stearate;
Three gallons of carbon tetrachloride;
Two gallons of acetone.
In this particular instance, the mineral oil and aluminum stearate will be cooked together at approximately 350 degrees Fahrenheit and thoroughly mixed during the cooking. The other ingredients will then be added.

Another instance consists in the following combination:
One gallon of beef tallow (heated);
Two gallons of carbon tetrachloride.
And a third illustration is as follows:
One gallon of heavy petrolatum;
One gallon of heavy mineral oil;
Three gallons of carbon tetrachloride;
Three gallons of ether.
In the last case, the petrolatum and mineral oil will be heated before adding the other ingredients which will be mixed under pressure of from twenty-five (25) to fifty (50) pounds pressure per square inch.

When carbon dioxide or other gas is added, it is at sufficient pressure to expel the air, as for instance approximately fifty (50) pounds per square inch at a temperature of seventy (70) degrees Fahrenheit, so as to discharge the lubricating solution from a container upon release of the same.

As above stated, the products which are adapted for the purpose of the present invention may be compounded together in any desired combination, with the most efficient percentage composition as conditions may determine, and the above combinations are only for purposes of illustration.

According to one form of the present invention, therefore, it consists of the combination of an oil or grease and one or more of the other products mentioned above, and there may be added also carbon dioxide or nitrogen, or other suitable gas under a suitable pressure, all of which may be subjected to proper treatment to form a complete solution, as herein explained. This union between these products may be effected by means of agitation, heat, or pressure, and any one or any combination of these three means may be employed for this purpose. After the present compound has been applied to the particular points on the machine structure, under normal atmospheric conditions, there remains only a grease or oil of comparatively heavy consistency in effective relation with respect to such parts of the machine. Either with or without the use of heat, agitation, or pressure, and whether the carbon dioxide or nitrogen or other gas be converted into liquid state or be absorbed as a gas by the other constituent parts of the compound, they are all combined into a perfect solution which may be easily handled by pouring from one container to another and which may be applied to the machine structure with the same ease and efficiency with which the ordinary lubricating oil is now applied, according to the old process, as above referred to.

There may also be added to this compound a small quantity of rubber in a suitable form as for instance rubber cement, approximately two or three per cent. The function of this ingredient is to serve as a means of holding the lubricant in place and also to increase the friction-reducing and cushioning qualities of the compounded lubricant. The addition of this component will thus reduce the wear between the parts. This component and also the carbon dioxide may be omitted, however, if so desired.

Applicant has brought together the products mentioned above and obtains a liquid form of combined product which possesses new advantages resulting from such combination. By such co-ordination of these products, and in their use, there is believed to be produced a chemical reaction with a correspondingly new property or result not possessed by either of the individual products which are thus brought together.

The present improved form of lubricating compound may be applied to various parts of the automobile or other form of machine structure by means of a brush of ordinary form, or it may be applied in the form of a spray with a fine needle stream. Also, this compound may be poured upon the parts to be lubricated and in any case, there is not required any pressure device for application to the various parts of the machine structure. Neither is it necessary to adjust any parts of the machine so as to permit entrance of the lubricant into the spaces therebetween. By virtue of the solvent or solvents which serve as a carrier means for the grease or oil, the compound upon being applied to the sides of springs or to the outer edges of other spaces or joints, will creep by capillary attraction into and throughout the spaces between the leaves of the springs, as well as into other spaces between the parts which are subjected to friction, and which require lubrication. When the present compound has reached the various spaces and parts which are intended to be lubricated, the volatile element or elements of the compound will virtually disappear either by volatilization into the atmosphere or by becoming jellied with the other ingredients, when exposed to the atmosphere. At any rate, there remains in the space which has thus been lubricated a comparatively heavy form of lubricant. The grease and/or oil will then function with all the efficiency which has heretofore been applied to these parts of the machine by the more or less laborious and expensive employment of a pressure device. The carrier for this compound is of such nature that the compound will, by such capillary attraction, find its way into the intermediate spaces which it is intended to occupy before such volatilization or jellying action, as herein referred to, takes place, and also the carrier will be so chosen that it will be capable of such conversion when exposed to ordinary atmosphere.

Thus, I have devised a lubricating compound which permits the user to enjoy the advantages of a grease form of lubricant or oil without being limited to the lighter grade of oil and at the same time, having all of the conveniences of a liquid with respect to handling and application to the various parts of the machine structure, as hereinbefore explained. The user of the present improved form of lubricating compound is also assured that the grease or oil content thereof will reach all of the various spaces and other parts due to the creeping action of this particular form of compound, as above described.

What I claim is:

1. A lubricating compound comprising a lubricant of heavy consistency, a volatile solvent therefor, carbon dioxide under suitable pressure, and rubber cement, all combined together into and still present in a complete solution ready for use and possessing the property of capillary attraction and adapted to assume a body of heavy consistency upon volatilization of the solvent when exposed to normal atmospheric conditions.

2. A lubricating compound comprising a heavy lubricant and a volatile solvent therefor, said lubricant and solvent being combined together in proper relative proportions to form and still be present in a complete solution ready for use and to which approximately two per cent of rubber is also added as part of the solution, said solution containing an inert gas under suitable pressure and being adapted to assume a body of heavy consistency upon volatilization of the solvent when exposed to normal atmospheric conditions.

JOHN F. WERDER.